(12) United States Patent
Sarnstrom et al.

(10) Patent No.: US 11,278,922 B2
(45) Date of Patent: Mar. 22, 2022

(54) PORTABLE SOLID PRODUCT DISPENSER

(71) Applicant: Ecolab USA Inc., St. Paul, MN (US)

(72) Inventors: Andrew Sarnstrom, Minneapolis, MN (US); Matthew D. Lausted, Hudson, WI (US); Karl A. Heinbuch, Roberts, WI (US); Peter T. Swenson, Cannon Falls, MN (US)

(73) Assignee: Ecolab USA Inc., Saint Paul, MN (US)

( * ) Notice: Subject to any disclaimer, the term of this patent is extended or adjusted under 35 U.S.C. 154(b) by 95 days.

(21) Appl. No.: 16/273,321

(22) Filed: Feb. 12, 2019

(65) Prior Publication Data

US 2019/0247874 A1    Aug. 15, 2019

Related U.S. Application Data

(60) Provisional application No. 62/629,897, filed on Feb. 13, 2018.

(51) Int. Cl.
  B05B 7/04        (2006.01)
  B05B 7/02        (2006.01)
  (Continued)

(52) U.S. Cl.
  CPC .............. B05B 7/04 (2013.01); B01F 1/0033 (2013.01); B01F 13/0027 (2013.01);
  (Continued)

(58) Field of Classification Search
  CPC ..... B05B 15/65; B05B 11/0054; B05B 7/025; B05B 1/02; B05B 1/265; B01F 1/0033;
  (Continued)

(56) References Cited

U.S. PATENT DOCUMENTS

| 989,826 A | 4/1911 | Thiele |
| 1,945,701 A * | 2/1934 | Pearl ..................... B05B 7/2462 |
| | | 239/312 |

(Continued)

FOREIGN PATENT DOCUMENTS

| CN | 201148341 Y | 11/2008 |
| CN | 101421023 A | 4/2009 |

(Continued)

OTHER PUBLICATIONS

POK Rambojet Quick Stick Foam Nozzle, Fire Safety U.S.A., Rochester, Minnesota, Dec. 14, 2017, 6 pages, https://firesafetyusa.com/item.aspx/15207-quick-stick-foam-nozzle/.

(Continued)

*Primary Examiner* — Tuongminh N Pham
(74) *Attorney, Agent, or Firm* — Fredrikson & Byron, P.A.

(57) ABSTRACT

A portable dispensing system for dispensing a solution of a fluid and a solid product includes a fluid line, a dispenser, and a cartridge. The fluid line includes a first and second fluid line ends and a fluid source connection at the first fluid line end. The dispenser is at the second fluid line end. The dispenser includes a body and a fluid outlet. The cartridge houses the solid product and includes a fluid inlet and a solution outlet. The cartridge is removably connected at the fluid inlet to the fluid outlet of the dispenser. The cartridge is configured to receive fluid from the fluid outlet of the dispenser such that fluid contacts the solid product housed in the cartridge and dissolves at least a portion of the solid product forming the solution. The cartridge is also configured to output the solution at the solution outlet.

6 Claims, 7 Drawing Sheets

(51) Int. Cl.
  *B05B 11/00* (2006.01)
  *F16L 37/48* (2006.01)
  *B05B 15/65* (2018.01)
  *B01F 13/00* (2006.01)
  *B01F 1/00* (2006.01)
  *B05B 1/26* (2006.01)
  *B05B 1/02* (2006.01)

(52) U.S. Cl.
  CPC .......... *B05B 7/025* (2013.01); *B05B 11/0054* (2013.01); *B05B 15/65* (2018.02); *F16L 37/48* (2013.01); *B05B 1/02* (2013.01); *B05B 1/265* (2013.01)

(58) Field of Classification Search
  CPC ..... B01F 13/0027; B01F 1/0027; F16L 37/48; Y10T 137/3112; E03C 1/046
  See application file for complete search history.

(56) References Cited

U.S. PATENT DOCUMENTS

| | | | |
|---|---|---|---|
| 2,477,998 A | 8/1949 | Mccowan | |
| 2,624,619 A | 1/1953 | Fletcher et al. | |
| 2,936,898 A | 5/1960 | Miguez | |
| 3,444,566 A | 5/1969 | Spear | |
| 4,199,001 A | 4/1980 | Kratz | |
| 4,347,224 A | 8/1982 | Beckert et al. | |
| 4,420,394 A | 12/1983 | Lewis | |
| 4,438,534 A | 3/1984 | Keyes et al. | |
| 4,595,520 A | 6/1986 | Heile et al. | |
| 4,680,134 A | 7/1987 | Heile et al. | |
| 4,729,880 A | 3/1988 | Dirksing et al. | |
| 4,732,689 A | 3/1988 | Harvey et al. | |
| RE32,763 E | 10/1988 | Fernholtz et al. | |
| 4,777,670 A | 10/1988 | Klinkhammer et al. | |
| RE32,818 E | 1/1989 | Fernholz et al. | |
| 4,898,202 A | 2/1990 | Craig | |
| 4,909,387 A | 3/1990 | Schutz | |
| 4,947,988 A | 8/1990 | Schutz | |
| 4,957,134 A | 9/1990 | Craig | |
| 5,007,559 A | 4/1991 | Young | |
| 5,192,431 A | 3/1993 | Holmes | |
| 5,194,230 A | 3/1993 | Pekarna et al. | |
| 5,262,132 A | 11/1993 | Bricker et al. | |
| 5,316,688 A | 5/1994 | Gladfelter et al. | |
| 5,374,119 A | 12/1994 | Scheimann | |
| 5,379,813 A | 1/1995 | Ing | |
| 5,384,102 A | 1/1995 | Ferguson et al. | |
| 5,389,344 A | 2/1995 | Copeland et al. | |
| 5,441,711 A | 8/1995 | Drewery | |
| 5,494,644 A | 2/1996 | Thomas et al. | |
| 5,580,448 A | 12/1996 | Brandreth, III | |
| 5,678,688 A | 10/1997 | Schuetz | |
| 5,782,109 A | 7/1998 | Spriggs et al. | |
| 5,810,999 A | 9/1998 | Bachand et al. | |
| 5,927,610 A | 7/1999 | Dutcher | |
| 5,932,093 A | 8/1999 | Chulick | |
| 6,164,042 A | 12/2000 | Tobolka | |
| 6,177,392 B1 | 1/2001 | Lentsch et al. | |
| 6,247,189 B1 | 6/2001 | Dean et al. | |
| 6,267,886 B1 | 7/2001 | Brandreth | |
| 6,280,617 B1 | 8/2001 | Brandreth | |
| 6,287,466 B1 | 9/2001 | Yassin | |
| 6,395,172 B1 | 5/2002 | Koike | |
| 6,444,174 B1 | 9/2002 | Lascombes | |
| 6,484,953 B2 | 11/2002 | Freier | |
| 6,604,546 B1 * | 8/2003 | Gilmore | B01F 5/0495 137/268 |
| 6,662,380 B1 | 12/2003 | Leonard et al. | |
| 6,773,668 B1 | 8/2004 | Everson et al. | |
| 6,855,252 B2 | 2/2005 | Brandreth, III | |
| 7,069,602 B1 | 7/2006 | Conway et al. | |
| 7,143,898 B1 | 12/2006 | Hoaglin | |
| 7,250,086 B2 | 7/2007 | Furber et al. | |
| 7,490,783 B2 | 2/2009 | Mueller et al. | |
| 7,597,861 B2 | 10/2009 | Thomas et al. | |
| 7,658,844 B2 | 2/2010 | Blanchette | |
| 7,934,403 B2 | 5/2011 | Cho et al. | |
| 8,075,847 B2 | 12/2011 | Zettlitzer et al. | |
| 8,079,770 B2 | 12/2011 | Widmer et al. | |
| 8,172,109 B2 | 5/2012 | Cadden | |
| 8,230,777 B2 | 7/2012 | Anson et al. | |
| 8,777,037 B2 | 7/2014 | Knopow et al. | |
| 8,889,048 B2 | 11/2014 | Stolte et al. | |
| 9,403,131 B2 | 8/2016 | Hedlund et al. | |
| 9,488,286 B2 | 11/2016 | Schwartz et al. | |
| 9,533,331 B1 | 1/2017 | Kane et al. | |
| 9,662,618 B2 | 5/2017 | Snodgrass et al. | |
| 9,850,060 B2 | 12/2017 | Freudenberg et al. | |
| 10,118,137 B2 | 11/2018 | Schwartz et al. | |
| 2002/0030004 A1 | 3/2002 | Hammonds | |
| 2002/0084228 A1 | 7/2002 | Sweeny et al. | |
| 2003/0205286 A1 | 11/2003 | Hennemann, Jr. et al. | |
| 2005/0077370 A1 | 4/2005 | Decker et al. | |
| 2005/0121058 A1 | 6/2005 | Furber et al. | |
| 2005/0167448 A1 | 8/2005 | Schall et al. | |
| 2005/0244315 A1 | 11/2005 | Greaves et al. | |
| 2006/0097076 A1 | 5/2006 | Mueller et al. | |
| 2006/0108455 A1 | 5/2006 | Thornton | |
| 2006/0133070 A1 | 6/2006 | Brown | |
| 2006/0191833 A1 | 8/2006 | Greene et al. | |
| 2006/0249183 A1 | 11/2006 | Kon et al. | |
| 2007/0214555 A1 | 9/2007 | Ferrara et al. | |
| 2008/0296214 A1 | 12/2008 | Blanchette | |
| 2010/0059421 A1 | 3/2010 | Reed et al. | |
| 2010/0239476 A1 | 9/2010 | King et al. | |
| 2011/0165034 A1 | 7/2011 | Carlson et al. | |
| 2011/0210139 A1 | 9/2011 | Limback et al. | |
| 2012/0001776 A1 | 1/2012 | Yu et al. | |
| 2012/0152813 A1 | 6/2012 | Stafford | |
| 2012/0241045 A1 | 9/2012 | Aouad | |
| 2012/0273585 A1 | 11/2012 | Broome | |
| 2012/0320706 A1 | 12/2012 | Sanville et al. | |
| 2013/0215705 A1 | 8/2013 | Mueller | |
| 2013/0216450 A1 | 8/2013 | Carroll et al. | |
| 2014/0056097 A1 | 2/2014 | Sanville et al. | |
| 2014/0233346 A1 | 8/2014 | Schultz et al. | |
| 2014/0263404 A1 | 9/2014 | Snodgrass et al. | |
| 2014/0271399 A1 | 9/2014 | Hedlund et al. | |
| 2016/0038889 A1 | 2/2016 | Freudenberg et al. | |
| 2017/0052051 A1 | 2/2017 | Emmert | |

FOREIGN PATENT DOCUMENTS

| | | |
|---|---|---|
| CN | 102307672 A | 1/2012 |
| CN | 103338721 A | 10/2013 |
| CN | 106687203 A | 5/2017 |
| EP | 0058507 A1 | 8/1982 |
| EP | 413373 B1 | 3/1993 |
| EP | 659956 A1 | 6/1995 |
| EP | 1289890 A1 | 3/2003 |
| EP | 2125250 B1 | 11/2011 |
| FR | 2764821 B1 | 8/1999 |
| JP | S48-059196 U | 7/1973 |
| JP | S61114720 A | 6/1986 |
| JP | H03084130 A | 4/1991 |
| JP | H09-187777 A | 7/1997 |
| JP | H09508579 A | 9/1997 |
| JP | 2005530602 A | 10/2005 |
| JP | 2009-543677 A | 12/2009 |
| JP | 2010167399 A | 8/2010 |
| JP | 2010528836 A | 8/2010 |
| JP | 2012157736 A | 8/2012 |
| WO | 9931018 A1 | 6/1999 |
| WO | 2008037869 A1 | 4/2008 |
| WO | 2014033689 A2 | 3/2014 |
| WO | 2016192771 A1 | 12/2016 |
| WO | 2017015505 A1 | 1/2017 |

(56) References Cited

OTHER PUBLICATIONS

Partial Machine Translation of Publication FR 2764821, Aug. 27, 1999, 6 pages.
International Patent Application No. PCT/US2019/017593, Invitation to Pay Additional Fees and Partial Search Report dated May 22, 2019, 14 pages.
International Patent Application No. PCT/US2019/017593, International Search Report and Written Opinion dated Jul. 24, 2019, 22 pages.

* cited by examiner

PORTABLE SOLID PRODUCT DISPENSER

RELATED APPLICATION

This application claims priority to U.S. Provisional Patent Application No. 62/629,897, filed Feb. 13, 2018, the entire contents of which are hereby incorporated by reference.

TECHNICAL FIELD

This disclosure generally relates to solid product dispensing systems and methods.

BACKGROUND

A dispenser is utilized to create a solution for use in a particular application. A number of different types of facilities employ dispensers for everyday applications. For instance, the solution created by the dispenser can be used at these facilities as a cleaning or sanitizing agent, such as a multi-surface cleaner, a glass cleaner, or bleaching agent. A dispenser generally includes a collection of mechanical components. Such components can be used to pressurize and input water, store a liquid chemistry, mix the input water with the stored liquid chemistry to create the solution, and deliver the solution out from a holding reservoir.

However, such prior dispensers generally lack versatility and can be burdensome to use. For one, these prior dispensers are often designed to be fixed in place (e.g., on a wall) at a location and used to create a single type of solution from a liquid chemistry. This may necessitate that a number of dispensers be installed at a facility that uses multiple types of solutions. Even in cases where the chemistry within the dispenser can be changed out, the mechanisms for doing so can be complicated and hazardous. Moreover, many of these prior dispensers cannot be conveniently moved for use at another location. In addition, many of these prior dispensers require a user to provide measuring, or dosing, input in order to create an appropriate use solution. As a result, the dispenser may only be able to be used by those trained, or otherwise suited, for operating it.

SUMMARY

In general, various exemplary embodiments relating to solid product dispensing systems and methods are disclosed herein. Various embodiments can be useful, for instance, in providing a portable, easy-to-use solid product dispensing system that may be conveniently transported and utilized wherever there is a fluid source. In general, various embodiments disclosed herein can use fluid pressure provided at the fluid source itself to erode a solid product chemistry and dispense a solution of the diluted chemistry for use in a desired application. Embodiments employing a solid product chemistry can be particularly useful in reducing the size of the dispensing system and thereby increasing the portability of the dispensing system. Moreover, embodiments disclosed herein may be versatile across different applications in that they allow different solid chemistries to be easily interchanged to create a variety of different solutions using the same dispensing system. And, at the same time, many embodiments can provide for a preconfigured dosing function appropriate for the particular solid chemistry being used in an application by providing a predetermined rate of dissolution that is appropriate for the type of solid product housed in the cartridge. For instance, in some such embodiments, simply changing out one solid product chemistry cartridge for another, different solid product chemistry cartridge at the dispenser can be all that is needed to adjust the dosing function to that appropriate for the different solid product chemistry cartridge.

One exemplary embodiment includes a portable dispensing system for dispensing a solution of a fluid and a solid product. This portable dispensing system embodiment includes a fluid line, a dispenser, and a cartridge. The fluid line includes a first fluid line end and a second fluid line end, with a fluid source connection at the first fluid line end for receiving the fluid. The dispenser is at the second fluid line end. The dispenser includes a body and a fluid outlet defined at the body. The cartridge houses the solid product and includes a fluid inlet and a solution outlet. The cartridge is removably connected at the fluid inlet to the fluid outlet of the dispenser. The cartridge is configured to receive the fluid from the fluid outlet of the dispenser such that the fluid contacts the solid product housed in the cartridge and dissolves at least a portion of the solid product forming the solution. The cartridge is also configured to output the solution at the solution outlet.

In a further embodiment of this portable dispensing system, the dispenser and/or the cartridge can be configured to provide for a predetermined rate of dissolution of the solid product housed in the cartridge. This can allow for different rates of dissolution appropriate for respective different solid products so that a rate of dissolution can be provided that is suitable for the particular type of solid product chemistry being used in a certain application. In one example, the fluid inlet of the cartridge defines an inlet area and this inlet area corresponds to the predetermined rate of dissolution. In this way, different cartridges housing different solid product chemistries can be interchanged in the portable dispensing system in a manner that allows for appropriate dissolution of the particular solid product chemistry being used. In another example, the fluid outlet of the dispenser defines a first outlet area and second outlet area. The first outlet area has a first size that is larger than a second size of the second outlet area. The first outlet area is configured to produce a first rate of dissolution of the solid product housed in the cartridge that is greater than a second rate of dissolution of the solid product housed in the cartridge. In one case, the fluid outlet of the dispenser can be configured to switch between delivering the fluid to the cartridge via the first outlet area and the second outlet area.

Another exemplary embodiment includes a method of dispensing a solution of a fluid and a solid product. This method embodiment includes connecting a first end of a fluid line to a fluid source. This method embodiment also includes connecting a first cartridge to a dispenser that is at a second end of the fluid line. The dispenser includes a body, a fluid outlet defined at the body, and an actuator configured to allow selective communication of the fluid from the fluid source to the first cartridge. The first cartridge houses the solid product and includes a fluid inlet and a solution outlet. The first cartridge is connected at the fluid inlet to the fluid outlet of the dispenser. This method embodiment further includes actuating the actuator to allow the fluid to be delivered to the fluid inlet of the first cartridge such that the fluid contacts the solid product housed in the first cartridge and dissolves at least a portion of the solid product forming the solution. This method additionally includes outputting the solution at the solution outlet of the first cartridge.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

FIG. 1A shows the portable dispensing system being connected to a fluid source and FIG. 1B shows the portable dispensing system dispensing a solution of a fluid, from the fluid source, and a solid product.

FIG. 2A shows the cartridge being removably connected to the dispenser and FIG. 2B shows the cartridge outputting the solution.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1A:
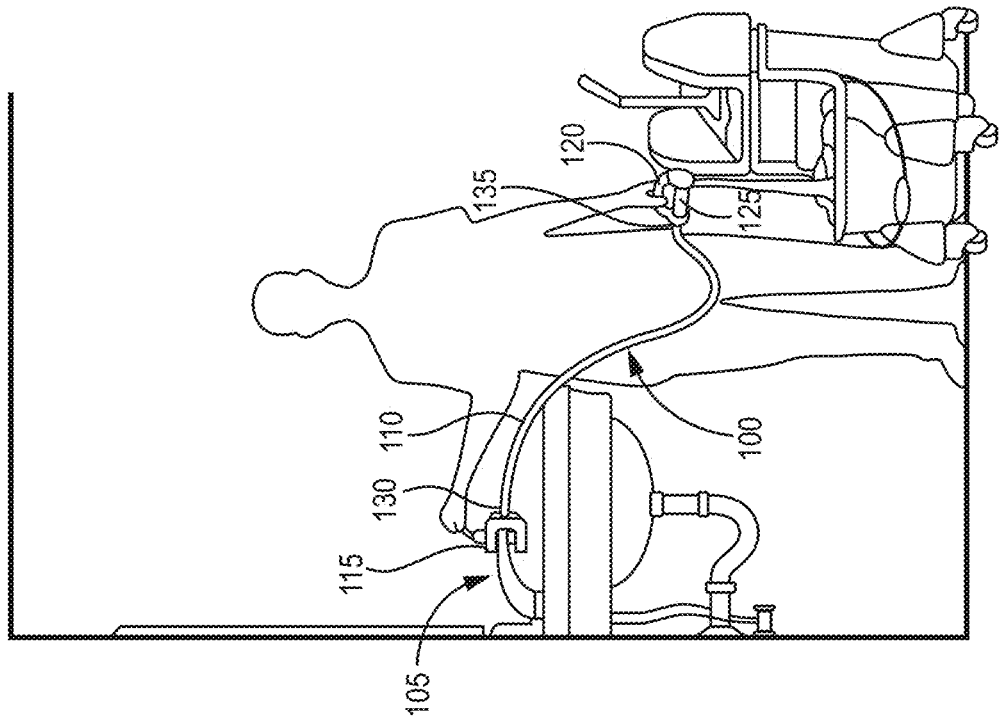
FIGS. 1A and 1B are schematic, exemplary illustrations of an exemplary embodiment of a portable dispensing system for dispensing a solution of a fluid and a solid product.
Figure 1B:
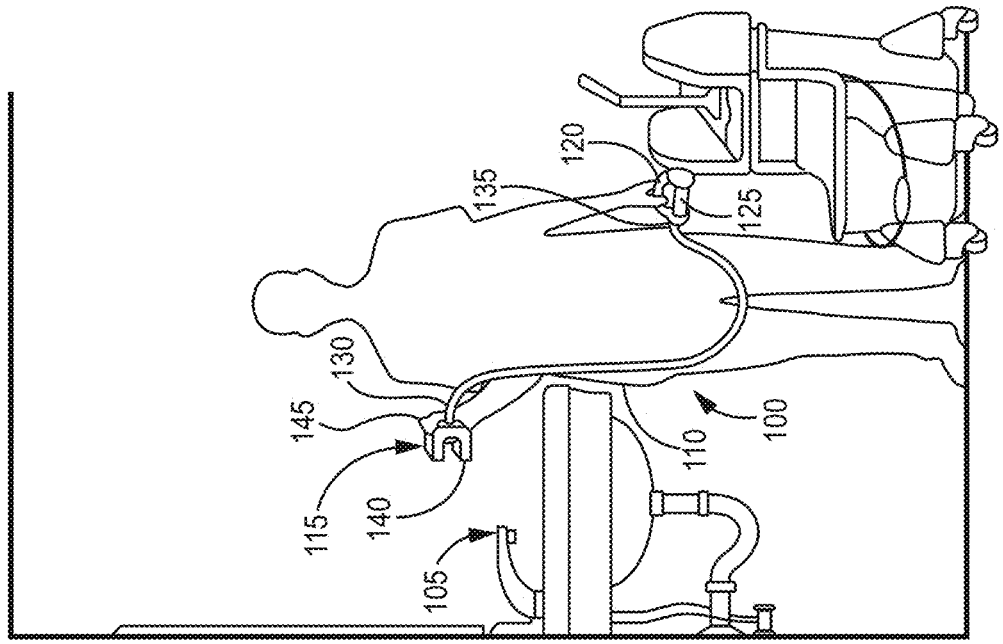

FIGS. 1A and 1B show schematic illustrations of an exemplary embodiment of a portable dispensing system 100. The portable dispensing system 100 can be used for dispensing a solution of a fluid and a solid product. FIG. 1A shows the portable dispensing system 100 being connected to a fluid source 105. The fluid source 105 can be any fluid source conveniently available at, or near, an intended location of use of the portable dispensing system 100. The fluid source 105 can provide fluid, to the portable dispensing system 100, at a fluid pressure that is greater than atmospheric pressure. In the example shown in FIGS. 1A and 1B, the fluid source 105 is a faucet. FIG. 1B shows the portable dispensing system 100, after being connected to the fluid source 105, dispensing the solution of the fluid, from the fluid source 105, and the solid product.

The portable dispensing system 100 can include a fluid line 110, a fluid source connection 115, a dispenser 120, and a cartridge 125. In general, as noted, the portable dispensing system 100 can receive a fluid and use this fluid to dissolve a solid product of a particular chemistry. In doing so, the portable dispensing system 100 can thereby form, and dispense, a solution of the fluid and the solid product. At the fluid source connection 115, the portable dispensing system 100 can be configured to connect to the fluid source 105 to receive the fluid. The fluid line 110 can convey the received fluid to the dispenser 120. The cartridge 125, housing the solid product, can be configured to receive the fluid from the dispenser 120 such that the fluid contacts the solid product housed therein and dissolves at least a portion of the solid product to form the solution. The cartridge 125 can then output the solution. The portable dispensing system 100 can allow for various cartridges 125 (e.g., housing different solid product chemistries) to be interchanged at the dispenser 120 as desired for an intended application of the portable dispensing system 100.

The fluid line 110 can serve as a means for conveying fluid from the fluid source 105 to the dispenser 120. Accordingly, the fluid line 110 can include a first fluid line end 130 and a second fluid line end 135, with the fluid source connection 115 at the first fluid line end 130 and the dispenser 120 at the second fluid line end 135. In the illustrated embodiment, the first fluid line end 130 and the second fluid line end 135 are on opposite ends of the fluid line 110. Though, in some embodiments, the fluid line 110 could include more than two ends with the first fluid line end 130 and the second fluid line end 135 being any two of such ends. In certain examples, the fluid line 110 could be made up of two or more fluid line segments and need not necessarily be a single continuous segment. The fluid line 110 can be made of any or more materials, such as hosing rubber materials(s) or polymer tubing material(s), as appropriate for pressure, flow rate, durability and other factors envisioned in the intended applications of the portable dispensing system 100.

The fluid source connection 115 can connect the first fluid line end 130 to the fluid source 105 and serve to receive fluid from the fluid source 105. As shown here, the fluid source connection 115 contacts, and connects directly to, the fluid source 105. As a result, fluid output from the fluid source 105 passes directly from the fluid source 105 to the portable dispensing system 100 and thus does not pass through an ambient environment prior to being received at the portable dispensing system 100. In some cases, this may help to substantially maintain the pressure of the fluid being output from the fluid source 105. The fluid source connection 115 can be configured to form a fluid tight seal with an output of the fluid source 105. The particular mechanisms of the fluid source connection 115 for connecting the first fluid line end 130 to the fluid source 105 can vary depending on the particular fluid source 105. For instance, the fluid source connection 115 can include threading or other fastening mechanism for connecting to the fluid source 105. In the illustrated example, the fluid source connection 115 includes a clamp 140 and a lever 145. The clamp 140 can include two generally parallel sides and one connecting side extending generally perpendicular to each of the two parallel sides. In this way, the clamp 140 can be configured to removably couple the fluid source connection 115 to the fluid source 105 (e.g., a faucet). The lever 145 can be configured as an actuating mechanism for securing the connection between the fluid source connection 115 and the fluid source 105 and/or opening fluid communication between the fluid source 105 and the first fluid line end 130 at the fluid source connection 115.

Fluid can be conveyed from the fluid source connection 115, through the fluid line 110, to the dispenser 120. The cartridge 125 can be removably connected to the dispenser 120 and house the solid product. The dispenser 120 can receive the fluid and deliver it to the cartridge 125. When the cartridge 125 receives the fluid from the dispenser 120, the fluid contacts the solid product housed in the cartridge 125 and dissolves at least a portion of the solid product forming the solution. The cartridge 125 can then output the solution, for instance into the ambient environment and/or into a solution container.

As noted, the cartridge 125 can be removably connected to the dispenser 120. Accordingly, the cartridge 125 can be removed from the dispenser 120 and another, different cartridge (e.g., housing a solid product chemistry different than that housed by the cartridge 125) can be connected to the dispenser 120. This may be useful, for instance, when the portable dispensing system 100 is desired to be used for forming a different solution for another application.

Figure 2A:
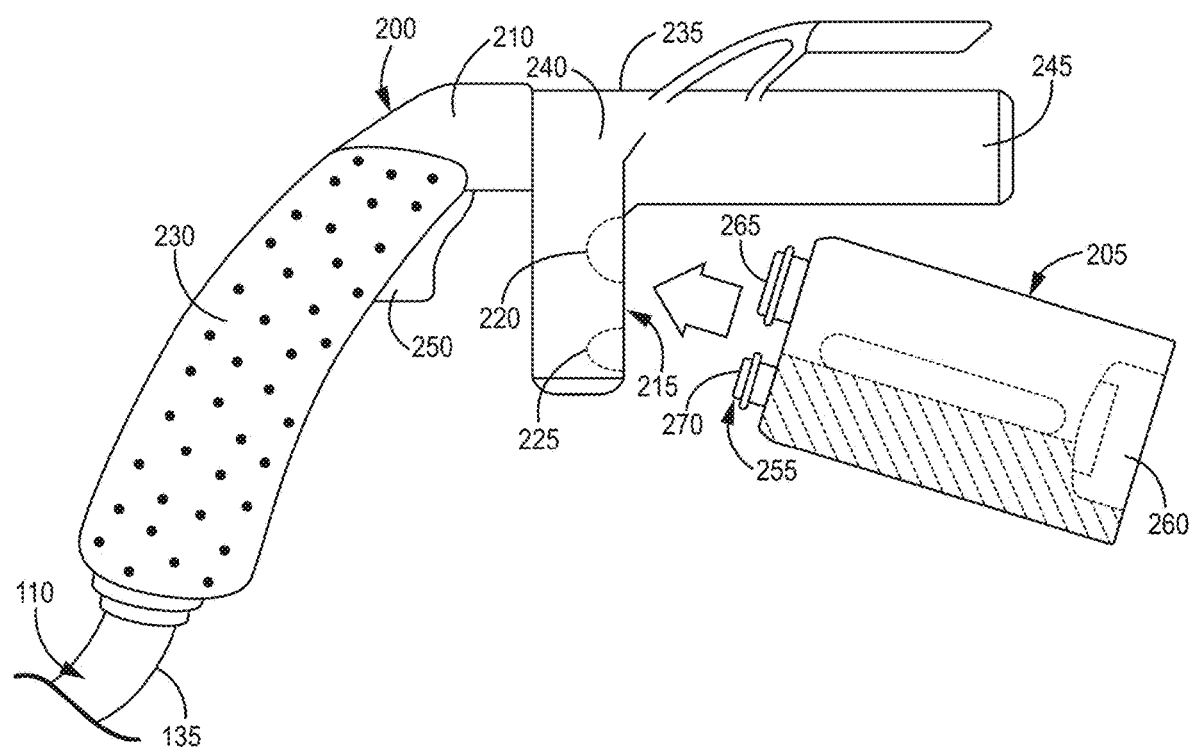
FIGS. 2A and 2B are elevational views of exemplary embodiments of a dispenser and a cartridge portion of the portable dispensing system of FIG. 1.
Figure 2B:
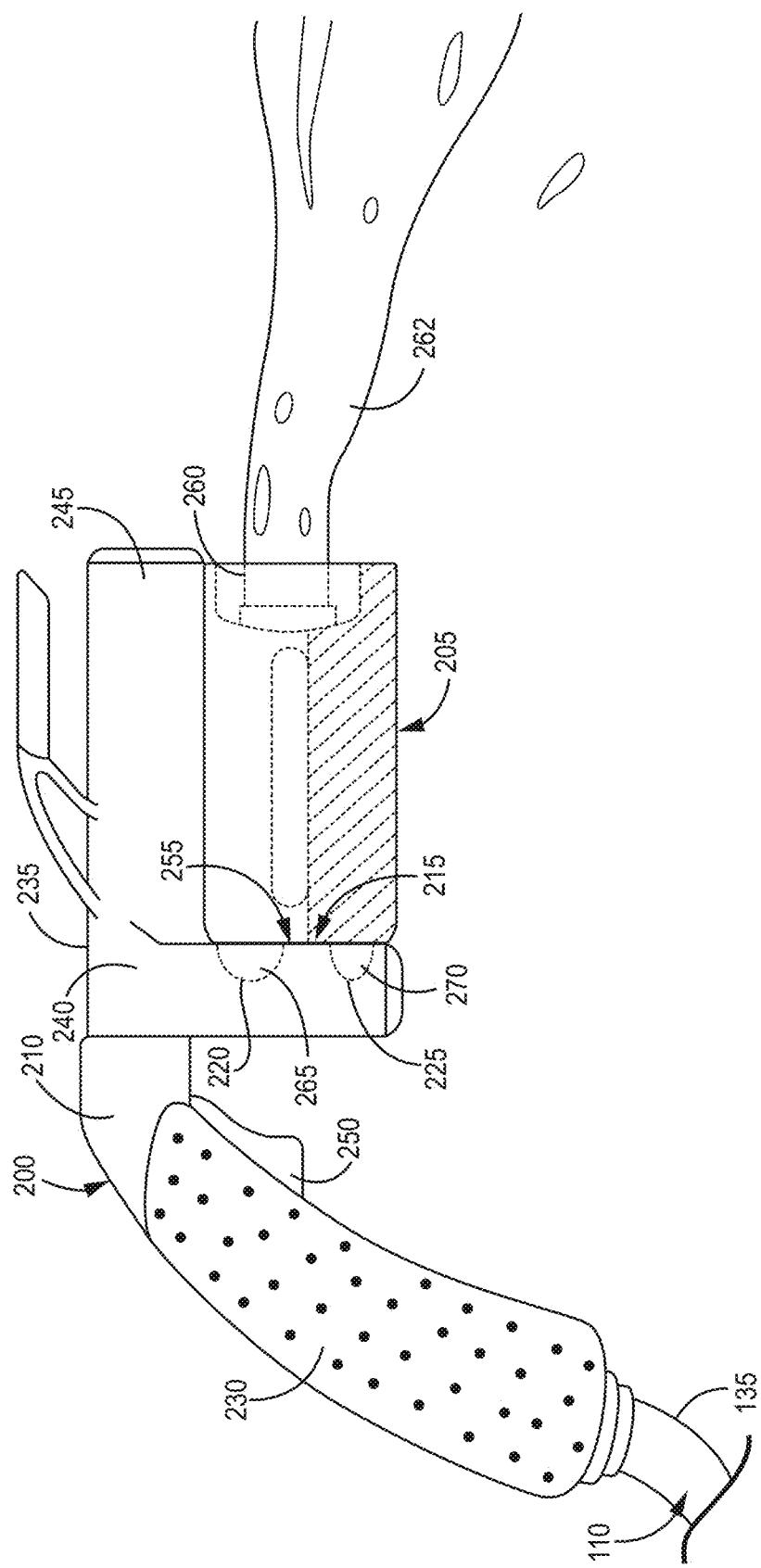

FIGS. 2A and 2B show close-up, elevational views of exemplary embodiments of a dispenser 200 and a cartridge 205. FIG. 2A shows the cartridge 205 being removably connected to the dispenser 200 and FIG. 2B shows the cartridge 205 outputting the solution. The illustrated embodiments of the dispenser 200 and cartridge 205 can be used in the portable dispensing system disclosed with respect to FIG. 1. As described with respect to FIG. 1, the dispenser 200 can be at the second fluid line end 135 of the fluid line 110.

The dispenser 200 can include a body 210. The body 210 can define a fluid outlet 215 thereat. The fluid outlet 215 can be configured to deliver fluid to the cartridge 205, when the cartridge 205 is connected to the dispenser 200. In some examples, the fluid outlet 215 can include more than one output area to the cartridge 205. For example, the fluid outlet 215 can define a first outlet area 220 and a second outlet area 225. As shown in the illustrated example, the first outlet area 220 has a first size that is larger than a second size of the second outlet area 225. The first outlet area 220 can be configured to produce a first rate of dissolution of the solid product housed in the cartridge 205 that is greater than a second rate of dissolution of the solid product housed in the cartridge 205 that the second outlet area 225 is configured to produce. Moreover, in certain embodiments, the fluid outlet 215 of the dispenser 200 can be configured to switch between delivering the fluid to the cartridge 205 via the first outlet area 220 and the second outlet area 225. In such embodiments, the body 210 of the dispenser 200 could include a button, or other input mechanism, to selectively deliver fluid to the cartridge 205 through one of the first outlet area 220 and the second outlet area 225. In other embodiments, the fluid outlet 215 of the dispenser 200 can be configured to deliver fluid to the cartridge 205 via both of the first and second outlet area 220, 225.

The body 210 of the dispenser 200 can form a handle 230 and a cartridge support 235. The handle 230 can be configured to be gripped by the hand of a user of the portable dispensing system and may, for instance, include an outer surface having an enhance coefficient of friction relative to the other portions of the body 210. The cartridge support 235 can be configured to hold the cartridge 205 when the cartridge is connected to the dispenser 200 and the fluid outlet 215 of the dispenser 200 can be located at the cartridge support 235. As shown in the illustrated example, the cartridge support 235 can include a base section 240 and an arm section 245. The base section 240 can include the fluid outlet 215 of the dispenser 200. The arm section 245 can extend out from the base section 240, for instance at a generally perpendicular orientation thereto. As shown here, in some cases the arm section 245 can include a secondary handle thereon for enhanced useability.

Dispenser 200 can further include an actuator 250. The actuator 250 can be configured to allow selective communication of fluid at the fluid outlet 215 to the cartridge 205. The actuator 250 can be biased to a position that prevents fluid communication at the fluid outlet 215 and when the bias is overcome can be moved to a different position that allows fluid communication at the fluid outlet 215. For instance, in the illustrated example, the actuator 250 is a trigger. When an external force is applied to the trigger, the trigger is configured to allow communication of the fluid at the fluid outlet 215 to the cartridge 205.

As noted, the cartridge 205 can house a solid product chemistry and be removably connected to the dispenser 200. Cartridges can include a visual indicator that conveys a type of solid product chemistry housed therein. For example, an outer surface of the cartridge 205 can be of a first color indicating that the cartridge 205 houses a solid product chemistry of a first type (e.g., for use as a multi-surface cleaner), while an outer surface of another cartridge can be of a second color indicating that this cartridge houses a solid product chemistry of a second, different type (e.g., for use as a bleaching agent). While each of the cartridges (and/or the dispenser 200) may be preconfigured to provide an appropriate rate of dissolution for the particular type of solid product housed within the cartridge, use of visual indicators can allow a user of the portable dispensing system to quickly ascertain which cartridge to use for a specific application when removably connecting, or interchanging, a cartridge at the dispenser.

The cartridge 205 can include a fluid inlet 255 and a solution outlet 260. The cartridge 205 can be removably connected at the fluid inlet 255 to the fluid outer 215 of the dispenser 200. Accordingly, the cartridge 205 can be configured to receive fluid from the fluid outlet 215 (e.g., when the actuator 250 is actuated) such that the received fluid contacts the solid product housed in the cartridge 205 and dissolves at least a portion of the solid product and thereby forms the solution. The cartridge 205 can be configured to output the formed solution 262 at the solution outlet 260. As shown in the illustrated example, the fluid inlet 255 and the solution outlet 260 are located at opposite ends of the cartridge 205.

The fluid inlet 255 defined by the cartridge 205 can define an inlet area that corresponds to a predetermined rate of dissolution for the solid product housed in the cartridge 205. Depending on the type of solid product housed in the cartridge 205, the inlet area can vary so as to correspond to an appropriate, predetermined rate of dissolution for that type of solid product housed in the cartridge 205. In some examples, the fluid inlet 255 can include more than one inlet area to the cartridge 205. For example, the fluid inlet 255 can define a first inlet area 265 and a second inlet area 270. As shown in the illustrated example, the first inlet area 265 has a first size that is larger than a second size of the second inlet area 270. The first inlet area 265 can be configured to produce a first rate of dissolution of the solid product housed in the cartridge 205 that is greater than a second rate of dissolution of the solid product housed in the cartridge 205 that the second inlet area 270 is configured to produce. The first inlet area 265 can be configured to be connected to the fluid outlet 215 at the first outlet area 220 and the second inlet area 270 can be configured to be connected to the fluid outlet 215 at the second outlet area 225.

The solution outlet 260 of the exemplary embodiment of the cartridge 205 illustrated in FIGS. 2A and 2B can be configured to output the formed solution 262 into the ambient environment. For instance, the solution outlet 260 can be configured to output the formed solution 262 as a fluid stream at a fluid pressure above atmospheric pressure directly into the ambient environment. This could include directing the formed solution 262 from the solution outlet 260, to the ambient environment, then ultimately into a solution container (e.g., a mop bucket) that is spaced about the ambient environment from the solution outlet 260. In this example, the solution outlet 260 can define a solution outlet area of a size that develops the formed solution 262 into the fluid stream at the fluid pressure above atmospheric pressure. In other embodiments, as discussed further below, the solution outlet at the cartridge can include one or more features useful for delivering the formed solution 262 directly into a solution container (e.g., without necessarily passing through the ambient environment).

Figure 3:
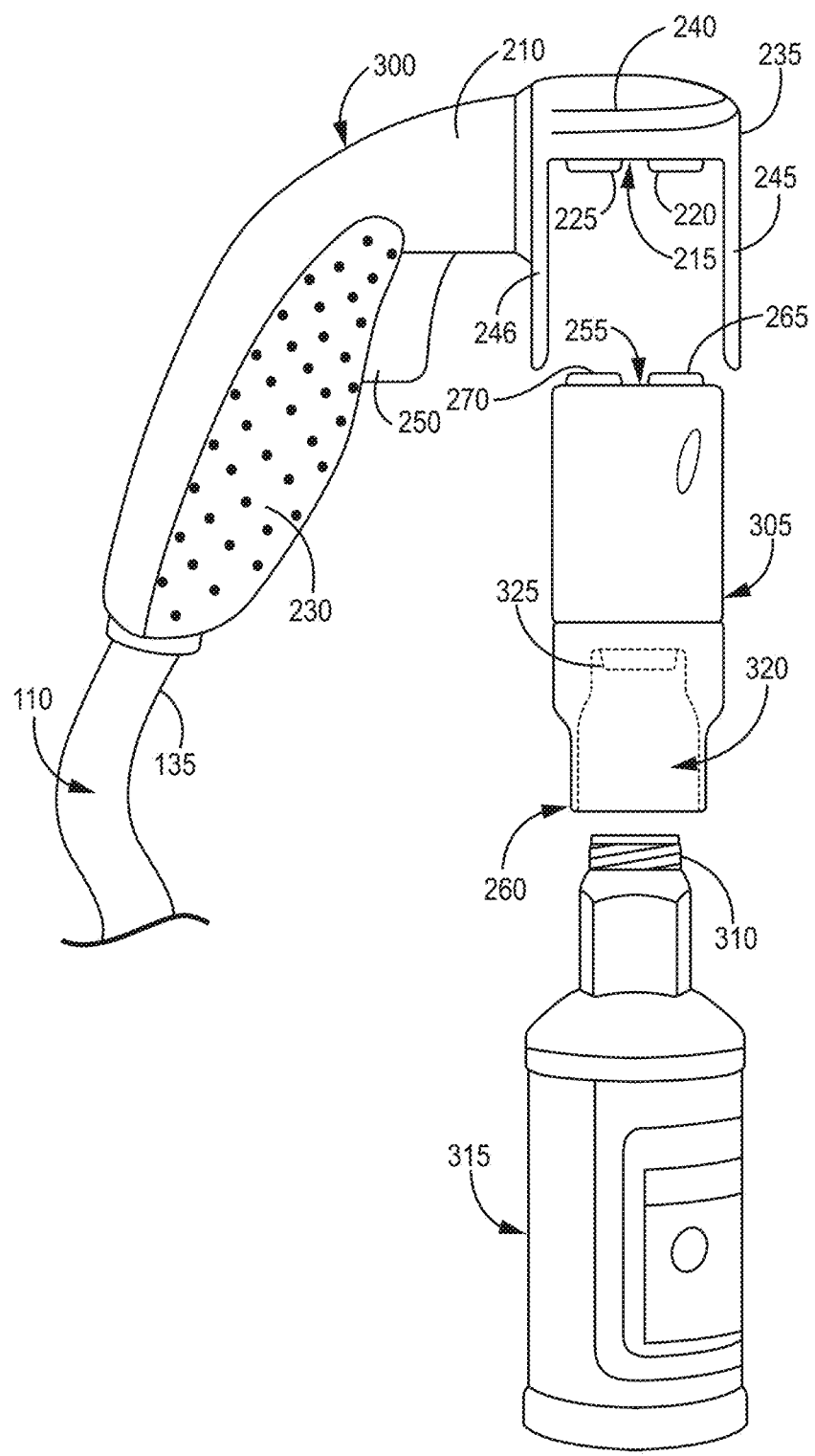
FIG. 3 is an elevational view of additional exemplary embodiments of both a dispenser and a cartridge portion of the portable dispensing system of FIG. 1.

FIG. 3 shows an elevational view of additional exemplary embodiments of a dispenser 300 and a cartridge 305. FIG. 3 shows the cartridge 305 being removably connected to the dispenser 300. The cartridge 305 shown in the example of FIG. 3 can be useful to connect to a nozzle 310 of a solution container 315. The illustrated embodiments of the dispenser 300 and cartridge 305 can be used in the portable dispensing system disclosed with respect to FIG. 1. As described with respect to FIG. 1, the dispenser 300 can be at the second fluid line end 135 of the fluid line 110. Furthermore, the illustrated embodiments of the dispenser 300 and cartridge 305 can include many features similar to those described with respect to the embodiments of the dispenser and cartridge in FIGS. 2A and 2B. Accordingly, the same reference characters used with respect to FIGS. 2A and 2B are used for FIG. 3 to convey the presence of these same features.

The dispenser 300 includes the body 210 which can from the handle 230 and the cartridge support 235. In the illustrated embodiment, the base section 240 lies generally perpendicular to the handle 230 (e.g., as opposed to generally parallel to the handle 230 as in the embodiment of FIGS. 2A and 2B). As such, the cartridge support 235 in this embodiment can orient the solution outlet 260 of the cartridge 305 on a longitudinal axis that is generally parallel to the handle 230. The cartridge support 235 can include the base section 240 as well as the arm section 245 and a second arm section 246. The base section 240 can include the fluid outlet 215 of the dispenser 200. The arm section 245 and the second arm section 246 can each extend out from the base section 240, for instance at a generally perpendicular orientation thereto. As shown here, the arm section 245 and the second arm section 246 extend out from the base generally parallel to each other and are spaced apart a distance generally corresponding to a width of the cartridge 305.

As noted, the illustrated embodiment of the cartridge 305 can be useful for connecting to the nozzle 310 of the solution container 315. Namely, here the solution outlet 260 of the cartridge 305 can include an adaptor 320 that is configured to connect to the nozzle 310 of the solution container 315. The adaptor 320 may be configured to contact, and connect directly to, the nozzle 310. The adaptor 320 can include a securing connector 325, for instance at an end portion of the adaptor 320. The securing connector 325 can have a structure that corresponds to a structure of the nozzle 310. For example, here the securing connector 325 includes threads adapted to secure corresponding threads at the nozzle 310 to the adaptor 320. In the illustrated example, the adaptor 320 extends from the solution outlet 260 internally within the cartridge 305. In some cases, as is shown here, the adaptor 320 can include two or more different diameters, for instance with a smaller diameter at the end portion of the adaptor 320 having the securing connector 325.

Accordingly, the solution outlet 260 of the exemplary embodiment of the cartridge 305 illustrated in FIG. 3 can be configured to output the formed solution into the solution container 315. The cartridge 305 can be removably connected at the fluid inlet 255 to the fluid outer 215 of the dispenser 300. As in the previous embodiment, the cartridge 305 can be configured to receive fluid from the fluid outlet 215 (e.g., when the actuator 250 is actuated) such that the received fluid contacts the solid product housed in the cartridge 305 and dissolves at least a portion of the solid product and thereby forms the solution. The cartridge 305 can be configured to output the formed solution at the solution outlet 260. For instance, the solution outlet 260 can be configured to output the formed solution at a fluid pressure above atmospheric pressure directly into the solution container 315, which the solution outlet 260 is configured to connect to.

Figure 4:
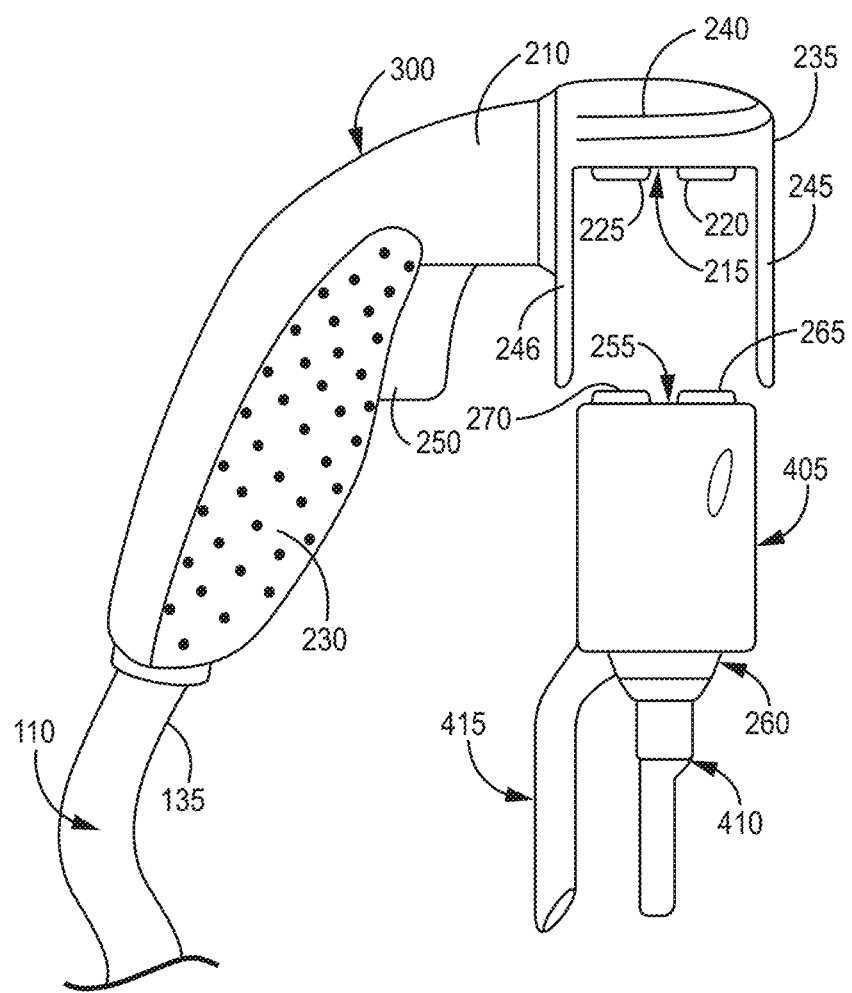
FIG. 4 is an elevational view of further exemplary embodiment of a cartridge portion of the portable dispensing system of FIG. 1.

FIG. 4 shows an elevational view of further exemplary embodiment of a cartridge 405. FIG. 4 shows the cartridge 405 being removably connected to the dispenser 300 disclosed in reference to FIG. 3. The cartridge 405 shown in the example of FIG. 4 can be useful to secure to a portion of a solution container. The illustrated embodiments of the dispenser 300 and cartridge 405 can be used in the portable dispensing system disclosed with respect to FIG. 1. As described with respect to FIG. 1, the dispenser 300 can be at the second fluid line end 135 of the fluid line 110. Furthermore, the illustrated embodiments of the dispenser 300 and cartridge 405 can include many features similar to those described with respect to the embodiments of the dispenser and cartridge in FIGS. 2A and 2B as well as FIG. 3. Accordingly, the same reference characters used with respect to FIGS. 2A, 2B, and 3 are used for FIG. 4 to convey the presence of these same features.

As noted, the illustrated embodiment of the cartridge 405 can be useful for securing the cartridge 405 to a portion of a solution container. Namely, here the solution outlet 260 of the cartridge 405 can include a dispensing tip 410 and a flange 415. As shown in the example of FIG. 4, the dispensing tip 410 can have a reduced cross-sectional area relative to the solution outlet 260 at a location upstream from the dispensing tip 410. The flange 415 can extend out from the cartridge 405 proximate the solution outlet 260 (e.g., from an end of the cartridge 405 where the solution outlet 260 is located). The flange 415 can be configured to secure the cartridge 405 to a solution container such that the dispensing tip 410 is disposed within the solution container. For example, the flange 415 could be configured to extend along an outer surface of the solution container and thereby act to support the cartridge 405 at the solution container, for instance along with the dispensing tip 410 extending along an opposite, inner surface of the solution container.

Accordingly, the solution outlet 260 of the exemplary embodiment of the cartridge 405 illustrated in FIG. 4 can be configured to output the formed solution into a solution container. The cartridge 405 can be removably connected at the fluid inlet 255 to the fluid outer 215 of the dispenser 300. As in the previous embodiments, the cartridge 405 can be configured to receive fluid from the fluid outlet 215 (e.g., when the actuator 250 is actuated) such that the received fluid contacts the solid product housed in the cartridge 405 and dissolves at least a portion of the solid product and thereby forms the solution. The cartridge 405 can be configured to output the formed solution at the solution outlet 260. For instance, the solution outlet 260 can be configured to output the formed solution from the dispensing tip 410 at a fluid pressure above atmospheric pressure and into a solution container. The flange 415 can be useful during the dispensing in supportably securing the cartridge 405 at the solution container.

As described for each of the exemplary cartridge embodiments, fluid is received at the cartridge and this fluid contacts the solid product housed within the cartridge and dissolves at least a portion of the solid product thereby forming the solution. In some cartridge embodiments, including those disclosed herein, one or more features may be included to help in the dissolution of the solid product within the cartridge. One such example is disclosed in FIG. 5.

Figure 5:
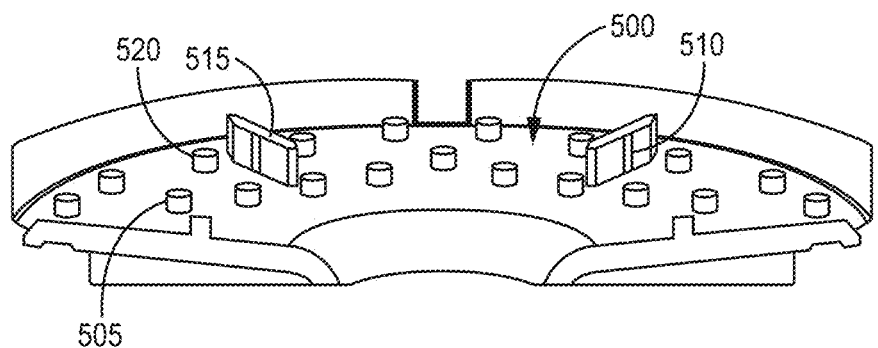
FIG. 5 is a cross-sectional view of a portion of an exemplary embodiment of an interior surface that could be included in an embodiment of a cartridge.

FIG. 5 shows a cross-sectional view of a portion of an exemplary embodiment of an interior surface 500 that could be included in an embodiment of a cartridge, including any of those cartridge embodiments disclosed herein. An interior surface of a cartridge can be a surface that interfaces with, and in many cases contacts, the solid product housed inside the cartridge. The interior surface 500 can form any one or more interior surfaces of a cartridge. For example, in one embodiment of a cartridge the interior surface 500 forms an interior surface of the cartridge at which the solution outlet is located. As an additional example, in another embodiment of a cartridge the interior surface 500 forms all interior surfaces of the cartridge.

The interior surface 500 can include pegs 505 that are configured to support the solid product housed within the cartridge. In some embodiments, the interior surface 500 can further include platforms 510 that are also configured to support the solid product housed within the cartridge. The platforms 510 can have a top surface 515 that is at an elevation different than a top surface 520 of the pegs 505. For instance, as shown here, the top surface 515 of the platforms 510 is at a greater elevation relative to the surface 500 than the top surface 520 of the pegs 505. Further, in some cases, a net surface area of the top surface 515 of the platforms 510 can be different than a net surface area of the top surface 520 of the pegs 505. For instance, as shown here, the net surface area of the top surface 515 of the platforms 510 can be less than a net surface area of the top surface 520 of the pegs 505.

The interior surface 500 may help to provide a more uniform dissolution of the solid product housed within the cartridge across a surface of the solid product that interfaces with the interior surface 500. In use, one or more surfaces of the solid product being dissolved within the cartridge can become soft. With the weight of one or more surfaces of the solid product supported by a relatively small number of platforms 510, the weight can be spread over a relatively small area. Accordingly, as the one or more surfaces of the solid product become softer, the platforms 510 may pierce the interfacing surface of the solid product, allowing the solid product to sink until it contacts the pegs 505. Thus, the platforms 510 can be configured such that, as the solid product is dissolved within the cartridge, the platforms 510 pierce an interfacing surface of the solid product so that the solid product moves onto the pegs 505. Because, in some embodiments, the pegs 505 can constitute a larger net surface area than platforms 510, the solid product can stop moving and come to rest on the pegs 505. This displacement of the solid product relative to the interior surface 500 may effectively increase the amount of solid product exposed to the fluid received at the cartridge. In turn, this can act to increase the concentration of the dissolved solid product in the formed solution. The pegs 505 and platforms 510 can be optimized so that the concentration increase resulting from the displacement of the solid product can counteract the concentration decrease that could result from the establishment wear patterns in the solid product.

Figure 6:
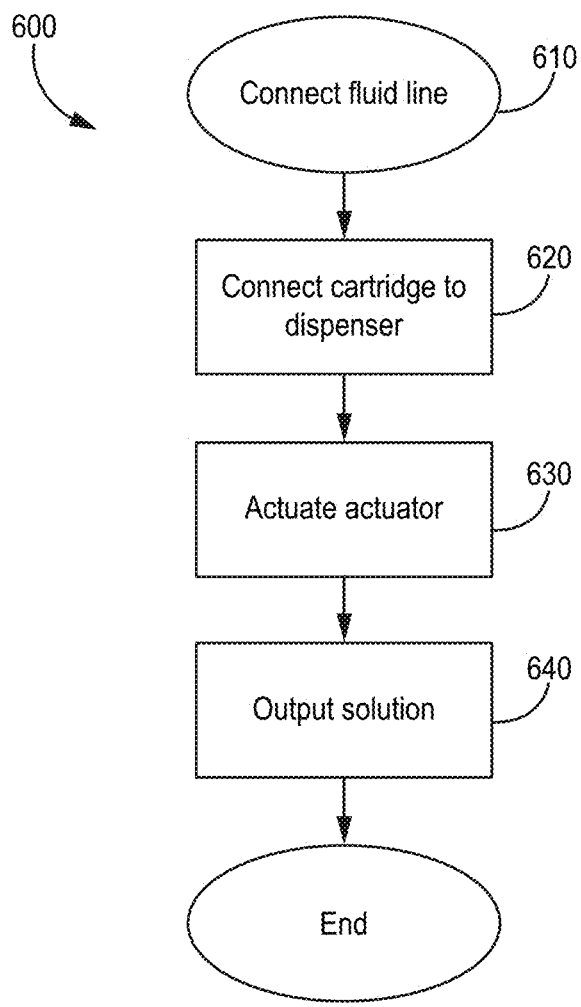
FIG. 6 is a flow diagram of an exemplary embodiment of a method of dispensing a solution of a fluid and a solid product.

FIG. 6 shows a flow diagram of an exemplary embodiment of a method 600 of dispensing a solution of a fluid and a solid product. In various embodiments, steps in the method 600 can include use of any one or more embodiments pertaining to the portable dispensing system described herein.

At step 610, a first end of a fluid line is connected to a fluid source. The fluid source can include any fluid source conveniently available at, or near, an intended location where the solution is to be dispensed, such as a faucet or other fixture at the location. In many cases, the fluid source to which the first end of the fluid line is connected provides the fluid at a pressure that is above atmospheric pressure. The first end of the fluid line may include a fluid source connection, such as that described herein, for facilitating a removable fluid connection between the first end of the fluid line and the fluid source.

At step 620, a first cartridge is connected to a dispenser that is at a second end (e.g., opposite the first end) of the fluid line. The dispenser to which the first cartridge is connected can be similar to, or the same as, any of the dispenser embodiments disclosed herein. The dispenser can include a body, a fluid outlet defined at the body, and an actuator that is configured to allow selective communication of the fluid from the fluid source to the first cartridge. The first cartridge can house a solid product chemistry and be similar to, or the same as, any of the cartridge embodiments disclosed herein. The first cartridge can include a fluid inlet and a solution outlet. The first cartridge can be connected at the fluid inlet to the fluid outlet of the dispenser.

At step 630, the actuator is actuated to allow the fluid to be delivered to the fluid inlet of the first cartridge. In doing so, the fluid can contact the solid product housed within the first cartridge and dissolve at least a portion of the solid product and thereby form the solution. As described elsewhere herein, the fluid being delivered to the first cartridge and used to dissolve the solid product can be brought into contact with the solid product so that a predetermined rate of dissolution for the solid product is achieved. For instance, the fluid can be delivered to the fluid inlet of the first cartridge through an inlet area having a first size defined by the fluid inlet at the first cartridge, and this inlet area can be configured to produce a rate of dissolution that corresponds to the solid product housed in the first cartridge.

At step 640, the formed solution is output at the solution outlet of the first cartridge. For instance, the solution outlet of the first cartridge can output the solution into the ambient environment and/or into a solution container. In one specific example, the solution outlet can output the solution as a fluid stream at a fluid pressure above atmospheric pressure directly into the ambient environment. This could include directing the solution from the solution outlet, to the ambient environment, then ultimately into a solution container that is spaced about the ambient environment from the solution outlet. In another specific example, the solution outlet could be supported at and/or connected to a solution container and the solution could be output into the solution container. In this example, the method could further include a step of connecting an adaptor at the solution outlet of the first cartridge to a nozzle of a solution container. For instance, this step of connecting to the adaptor could be performed prior to outputting the solution at the solution outlet.

In an additional embodiment, the method 600 could further include a step of replacing the first cartridge at the dispenser with another cartridge. When included, this step may involve removing the first cartridge from the dispenser and attaching a second cartridge to the dispenser after removing the first cartridge. The second cartridge can house a different solid product chemistry than that housed by the removed first cartridge. As a result, this exemplary embodiment of the method 600 could allow for dispensing different solutions, of the different solid product chemistries in the respective cartridges, as needed for different applications simply by removing and replacing a cartridge at the dispenser. Moreover, in instances where an application of a formed solution is needed at a different location, an exemplary embodiment of the method 600 could include disconnecting the first end of the fluid line from the fluid source and connecting the first end of the fluid line to a fluid source at a different location. As such, different solutions can be conveniently dispensed at different locations as desired.

Various non-limiting exemplary embodiments have been described. It will be appreciated that suitable alternatives are possible without departing from the scope of the examples described herein. These and other examples are within the scope of the following claims.

What is claimed is:

1. A portable dispensing system for dispensing a solution of a fluid and a solid product, the portable dispensing system comprising:
   a fluid line including a first fluid line end and a second fluid line end;
   a fluid source connection at the first fluid line end for receiving the fluid;
   a dispenser at the second fluid line end, the dispenser including a body and a fluid outlet defined at the body, the fluid outlet defining a first outlet area and a second outlet area spaced apart from the first outlet area, the first outlet area being larger than the second outlet area, the first outlet area configured to produce a first rate of dissolution of the solid product housed in the cartridge that is greater than a second rate of dissolution of the solid product housed in the cartridge that the second outlet area is configured to produce; and
   a cartridge housing the solid product, the body of the dispenser forming a cartridge support that is configured to hold the cartridge, the fluid outlet of the dispenser located at the cartridge support, the cartridge support including a base section and an arm section that extends out from the base section, the cartridge including a fluid inlet and a solution outlet, the fluid inlet at a first end of the cartridge that is adjacent the fluid outlet of the dispenser and directly adjacent the base section, the fluid inlet of the cartridge defining a first inlet area and a second inlet area spaced apart from the first inlet area, the first inlet area being larger than the second inlet area, the solution outlet at a second end of the cartridge opposite the fluid outlet of the dispenser and opposite the base section, the cartridge being removably connected at the dispenser via a first removable connection between the first outlet area and the first inlet area and a second removable connection between the second outlet area and the second inlet area, wherein the cartridge is configured to receive the fluid from the fluid outlet of the dispenser such that the fluid contacts the solid product housed in the cartridge and dissolves at least a portion of the solid product forming the solution, and wherein the cartridge is configured to output the solution at the solution outlet such that the solution passes from the solution outlet to an ambient environment.

2. The portable dispensing system of claim 1, wherein the dispenser includes an actuator that is configured to allow selective communication of the fluid to the fluid inlet of the cartridge.

3. The portable dispensing system of claim 2, wherein the actuator is a trigger, and wherein the trigger is configured to allow communication of the fluid to the fluid inlet of the cartridge when an external force is applied to the trigger.

4. The portable dispensing system of claim 1, wherein the body of the dispenser forms a handle.

5. The portable dispensing system of claim 4, wherein the fluid outlet of the dispenser is located at the base section.

6. The portable dispensing system of claim 1, wherein the cartridge is configured to output the solution at the solution outlet such that the solution passes from the solution outlet directly to the ambient environment.

* * * * *